Nov. 15, 1949     J. A. SENN     2,487,947
THIN-WALLED DIAPHRAGM POWER UNIT
Filed June 22, 1945
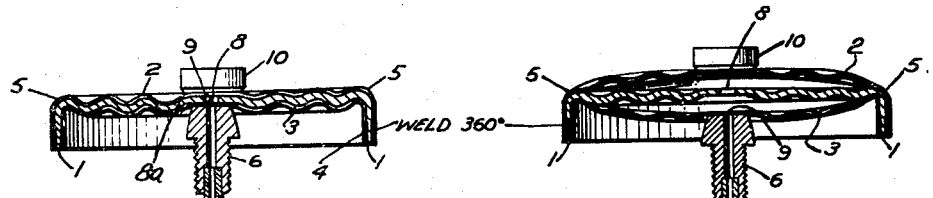
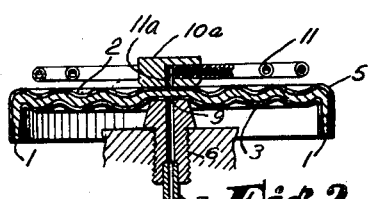
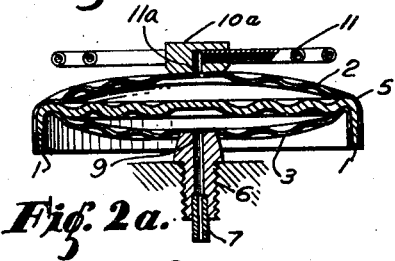
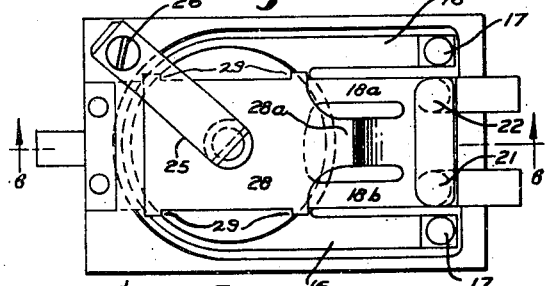
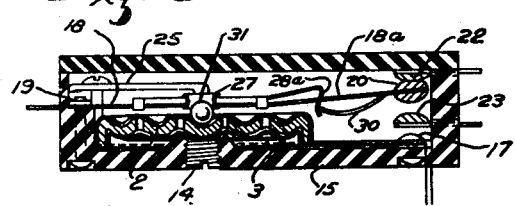
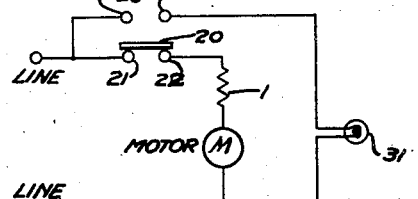
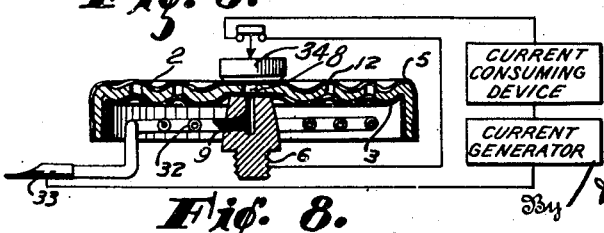
Inventor
JURG A. SENN
By Henry G. Bartel
Attorney Patented Nov. 15, 1949

2,487,947

UNITED STATES PATENT OFFICE 2,487,947

THIN-WALLED DIAPHRAGM POWER UNIT

Jurg A. Senn, Washington, D. C.

Application June 22, 1945, Serial No. 600,862

9 Claims. (Cl. 60—25)

1

This invention relates to corrugated diaphragms employed in pairs as power units for exerting force externally thereof for various applications such as actuating switch arms, etc. Such diaphragms are concentrically corrugated, nesting discs having peripheral wall portions angularly disposed with respect to the general plane of the corrugations. The marginal wall portions of two superposed, diaphragm elements are joined as by welding or soldering and one element is centrally apertured for the passage of a pressure fluid into the diaphragm interior to move one or both walls outwardly and shift the switch arm with its adjacent diaphragm element. A diaphragm of this type is shown in the patent to Persons 2,180,018.

The disc material for variable, fluid-content diaphragms as described, as well as aneroid diaphragms wherein the wall movements are due to variable, external fluid pressure as of the atmosphere, for example, upon a fixed quantity of contained gas, is selected usually from the group of precipitation hardenable metals such as beryllium copper, Z-nickel, etc., since they readily take the form of the die in their soft state and may be subsequently hardened. Materials that depend for their final hardness on the hardness of the blank and the work hardening incident to formation must be formed from relatively hard material. The last-named characteristic, however, requires increased die pressure and is more wearing on the die elements. Also the stress limit of such material is less so that deep corrugations may not be made without weakening or fracturing the blank.

Since the central deflection of a beryllium-copper, corrugated diaphragm varies directly as its diameter and inversely as its thickness, it is obvious that the diaphragm material should be as thin as possible in order to obtain large deflections with minimum diameter. In the manufacture of power units utilizing thin-walled, diaphragm sections two problems are encountered, viz.: (a) extreme wall thinness is accompanied by structural weakness and the likelihood of collapse, and (b) clamping of the diaphragm assembly during hardening and prior to welding of the rim is necessary to prevent the asymmetric effect of the precipitation hardening temperature at various portions of the diaphragm from warping the latter. In this connection it is to be noted that rim welding of diaphragm elements prior to hardening is quite difficult and it is not feasible for production due to the tendency of the soft metal to flow and rupture if the critical pressure of the welding rollers is exceeded.

It is an object of my invention to provide a precipitation hardenable, metal power unit utilizing extremely thin, corrugated diaphragm elements and hence responsive to minute changes in internal fluid pressure.

Another object is to provide a precipitation hardenable, metal power unit that is self-supporting during the hardening step following the forming of the corrugated diaphragm elements and prior to welding thereof.

Another object is to provide an extremely sensitive power unit having a central, corrugated structure supporting a pair of adjacently-disposed, corrugated diaphragm elements of such thinness as to be readily collapsible and warped in normal use without such supporting structure.

Another object of my invention is to provide a completely sealed, thin-walled corrugated diaphragm assembly which includes a central support therein, the latter serving as a heating element for the contained fluid.

A still further object is to provide a completely sealed, thin-walled, corrugated diaphragm power unit having an external fluid conduit which forms the resistance heater portion of an external electrical circuit.

Reference is now made to the drawing wherein

Fig. 1 is a central, sectional view of a thin-walled diaphragm assembly according to my invention and showing the unit in the zero pressure or closed position;

Fig. 1a is a view similar to Fig. 1 but showing the assembly in a somewhat expanded position;

Fig. 2 is a central, sectional view of a thin-walled diaphragm assembly according to a modified form of my invention and showing the unit in zero pressure position;

Fig. 2a is a view similar to Fig. 2 but showing the assembly in an expanded position;

Fig. 3 is a central, sectional view of a completely sealed, corrugated diaphragm having extremely-thin walls and shown in its low temperature position;

Fig. 3a is a view of the diaphragm of Fig. 3 but showing the same in its high temperature or expanded position;

Fig. 4 is a central, sectional view of a diaphragm similar to that shown in Fig. 3 but having the central support provided with angular extensions;

Fig. 5 is a plan view of an electric switch utilizing a diaphragm assembly similar to that shown in Fig. 4;

Fig. 6 is a sectional view of the switch of Fig. 5 taken along the line 6—6;

Fig. 7 is one form of circuit utilizing the switch of Figs. 5 and 6; and

Fig. 8 is a central, sectional view of a corrugated diaphragm assembly generally similar to Figs. 3 and 3a but having an integral, external heater tube.

In the form of my invention shown in Fig. 1 a central, rigid supporting structure 8a is nested with extremely thin, upper and lower flexible diaphragm elements 2 and 3 which are corrugated identically to central structure 8a and have their marginal walls welded to the marginal portion 1 of the central structure 8a over an area 4 which is spaced axially from the peripheral corrugation 5. A fixed nipple 6 having a tube 7 may be suitably joined to an aligned aperture 9 in the center of the diaphragm element 3 for the ingress of pressure fluid from a remotely located source (not shown). An aperture as 8 is provided in the central structure 8a in alignment with the aperture 9 for permitting pressure fluid to move the upper diaphragm element 2 and its coupling member 10 away from the central structure 8a and the latter away from the fixed nipple 6 as shown in Fig. 1a. Coupling member 10 transmits the movement of the diaphragm to the switch arm or other device as is well known in the art.

The diaphragm shown in Figs. 1 and 1a is preferably formed in production by feeding a strip of stiff, relatively thick, and suitably apertured metal such as steel, brass, beryllium copper, etc., between two strips of .002 to .006 in. beryllium copper and bringing the superposed strips between the punch and pad of a corrugated forming die for corrugating the three discs simultaneously. The discs shaped and assembled as shown in Fig. 1 are removed from the die and then heated in a 600 degree Fahrenheit oven for about one hour to harden the same. Throughout the hardening stage the rigid supporting structure 1 serves to hold the thin, corrugated discs in intimate, nesting relation without the necessity of providing additional clamps as would otherwise be necessary to prevent warping and permanent deformation of the diaphragms by the elevated temperature. Such warping is most severe where the artio of diaphragm diameter to wall thickness is large and the inherent, self-support correspondingly small. Elimination of the clamping operation effects a considerable saving in time, labor and equipment.

It will be observed that welding of the diaphragm assembly in Figs. 1 and 2 (after hardening) takes place in the marginal walls but beyond the curved portion of the peripheral corrugation 5. This is an important feature since welding of this outermost corrugation would impair its proper functioning. As a result of many experiments I have found that the radius of curvature of this rim affects considerably the expansion and contraction of the diaphragm assembly and the length of its fatigue life. If the radius is too small, excessive stresses will be imposed on the rim during forming and the diaphragm will tend to crack along this curve of stress long before the normal, useful life of the diaphragm has been reached; if the radius is excessive, the diaphragm will not be capable of withstanding the normal, maximum stresses imposed on the structure, particularly if there is any shifting of the terminal flange beyond the curved rim so that all portions of the rim are not deflected by equal amounts. The radius of curvature in a particular diaphragm depends on the dimensions of the diaphragm and the diaphragm material as well as its thickness.

The unyielding rim and welded flange portions of my central support 1 permit maximum deflection of the stressed diaphragm rim short of cracking in the first, above-mentioned case, while providing a rigid, accurately contoured, stationary, reference template or die over which minor wall deformations of the second-mentioned case may be eliminated on return of the assembly to the closely nested position. The structure described serves also to minimize distortion due to unequal rim stresses and deflections which arise from slight variations in the thickness of the diaphragm blank. Since the diaphragm element corrugations in their zero-pressure position are also in continuous, nested contact with the identically contoured, central support, the latter, too in this position will tend to correct any deformation or misalignment of the thin corrugations incurred while expanded as well as to make mechanical injury to the nested corrugations or rims during shipment, installation or use extremely unlikely. In short, the provision of the rigid, central support makes feasible for the first time the use of thin, precipitation hardenable metal walls in self-supporting, non-deformable, corrugated power units.

The diaphragm assembly or power units of Figs. 2 and 2a is similar to that shown in Figs. 1 and 1a except for the omission of the aperture 8 in the central reinforcing element and the substitution of a bored, coupling member 10a having a flexible, coiled conduct 11 connected thereto. An aperture 11a is provided in the upper diaphragm element 2 to allow the ingress of pressure fluid to the sealed chamber at the upper side of the reinforcing element 1. In this form of my invention the upper chamber may be subject to the pressure from one source of fluid while the lower chamber may be subject to the fluid pressure from another source. Since the nipple 6 is fixed, coupling member 10a may move within the limits of total diaphragm movement according to the algebraic sum of the individual pressures in the respective chambers.

In Fig. 3 is shown a completely sealed, thin-walled, diaphragm assembly resembling those previously described but containing an accurately determined quantity of volatile liquid filling one or more recesses 12 provided in the central structure 1. The recesses 12 are formed prior to the corrugated step and preferably preforate the structure 1. The recessed central strip, together with the outer strips is accurately positioned between the punch and pad members of the die and immersed in the volatile liquid which immediately fills the recesses. As the corrugations are formed, a uniform quantity of liquid is trapped in the recesses, the excess between the diaphragm sections being squeezed out at the edges of the rim. Welding of the rims may be carried out following the forming step if the flexible diaphragms are of sufficient thickness, however, I prefer to harden the assembly prior to this step for reasons previously given. Instead of hardening in an oven utilizing air as the heated medium, it is necessary to place the formed assemblies in a high pressure bomb containing a liquid having the same thermal expansion characteristics as the liquid trapped in the recesses 12, preferably the identical liquid. As the liquid immersing the assemblies is heated to hardening temperature, the inherent clamping action exerted by the central structure 1 will prevent distortion of the units as previously described. Also the pressure exerted by the heated liquid trapped in the recesses 12 will be exactly balanced by the pressure exerted by the heated, immersing liquid. After hardening is completed, the diaphragm assemblies are removed from the bomb and the rim welded as previously described.

The completely sealed power unit disclosed herein may be economically manufactured in large quantities and with great uniformity in the finished product. The wide variety of volatile liquids and the equally diverse, diaphragm element materials and thicknesses enable it to be used in a great many industrial applications. It compares very favorably with strip bimetal, for example, in its greater deflection and power output for a given change in temperature, as well as in its greater sensitivity in the extremely, thin-walled version.

In Fig. 4 I have shown a form of completely sealed, power unit similar to that of Figs. 3 and 3a except for the provision of a central structure that is selected for its electrical resistance properties and the addition of oppositely disposed electrical terminals 1a. It will be understood that the manner of supporting either of the completely sealed power units described is not material so long as the work movement of the central portion of the diaphragm elements is not impaired. To utilize fully the deflection of both elements, the center of one must be taken as the fixed reference or support.

The electrical switch of Figs. 5 and 6 illustrates an application of the Fig. 3 structure in which the lower diaphragm element is supported by the central screw 14 extending through a threaded aperture in the insulated base 15. The central structure 1 of the power unit is in this case formed with parallel extensions 16 terminating at 17 for the connection of electrical conductors in a manner similar to Fig. 4 as will be obvious. A flexible switch arm 18 is mounted on the base 15 at 19 and carries a bridging contact 20 adapted to engage contacts 21, 22 in the position shown and contacts 23, 24 in its lower position. A spring arm 25 mounted at 26 on the base 15 carries an eyelet 27 which extends also through an aperture in a base plate 28 having guides 29 turned under the opposite edges of arm 18 and a spring tongue 28a engaged by a similar tongue 30 of the arm 18. It will be seen from the circuit of Fig. 7 that as the resistance heater 1 of the power unit is heated due to an excessive current flowing through the motor circuit on overload, for example, that the volatile liquid will expand, moving the upper diaphragm element against the spring-pressed ball 31 which snaps the contacts 20 from engagement with contacts 21, 22 into engagement with contacts 23, 24 to open the motor circuit and close the circuit through signal lamp 31.

In Fig. 8 I have shown a further modification of my completely sealed power unit which is expanded by the electric current heating of a thin-walled tube 32 coiled beneath the diaphragm wall and communicating with the power unit interior through a bored nipple 6 which serves as a fixed reference or support. Tube 32 is made of electrical resistance material and conducts the electrical current from a connection at lug 33 formed as the sealed-off end of tube 32 and a connection (not shown) made with the nipple 6. This power unit responds very quickly to heating of the tube 32 not only through the expansion pressure of the liquid filling the latter, but also through heating of the liquid in recesses 12 due to the proximity of the coil 32 beneath the lower diaphragm element 3. Coupling member 34 mounted on the upper diaphragm element 5 serves as the switch actuating means. What is provided in Fig. 8, therefore, is essentially a completely sealed, constant, fluid-content, reinforced diaphragm wherein the heating effect of electric current is most effectively utilized.

While I have shown and described certain preferred embodiments of my invention it will be understood that I do not intend to be limited thereby, but that my invention may be otherwise embodied within the scope of the following claims.

I claim:

1. An expansible assembly comprising a pair of similarly corrugated, extremely thin and flexible diaphragm elements having curved outer rims terminating in peripheral flange portions which are disposed to one side of the general planes of said elements, and an identically corrugated, rigid supporting element of substantially uniform thickness closely nesting between said elements and welded thereto only at said flange portions, at least one of said elements being provided with an opening for a pressure transmitting fluid.

2. An expansible assembly comprising a pair of similarly corrugated, extremely thin, beryllium-copper diaphragm elements having curved, outer rims terminating in peripheral flange portions which are disposed to one side of the general planes of said elements, and an identically-corrugated, rigid supporting element of substantially uniform thickness nesting closely between said elements and welded thereto only at said flange portions, two of said elements being provided with an opening for a pressure-transmitting fluid.

3. An expansible assembly comprising a pair of similarly corrugated, extremely thin and flexible, precipitation hardenable diaphragm elements having curved, outer rims terminating in peripheral flange portions which are angularly disposed with respect to the general planes of said elements, one of said elements being centrally apertured, and an identically-corrugated, rigid supporting element of substantially uniform thickness nesting closely between said elements, said supporting element being apertured and united to said diaphragm elements only at said flange portions whereby expansion of said assembly will not produce an undesirable concentration of stress in said rims.

4. An expansible assembly comprising a pair of similarly corrugated, extremely thin and flexible diaphragm elements having curved, outer rims terminating in peripheral flange portions which are angularly disposed with respect to the general planes of said elements, each of said elements being centrally apertured for the passage of a pressure-transmitting fluid, and an identically-corrugated, rigid supporting element of substantially uniform thickness nesting closely between said elements and welded thereto only at said flange portions whereby upon expansion of said assembly by fluid entering therein concentrated stress in said rims will be avoided.

5. An expansible, fluid pressure assembly comprising a pair of similarly corrugated, thin and flexible diaphragm elements having curved, outer rims terminating in peripheral flange portions, an identically-corrugated, rigid supporting element of substantially uniform thickness nesting closely between said elements and provided with a small recess therein, and a volatile liquid completely filling said recess in the fully nested position of said diaphragm elements, the flange portions of said elements being united throughout their extent to provide a completely sealed diaphragm assembly.

6. An expansible, fluid pressure assembly comprising a pair of similarly corrugated, thin and flexible diaphragm elements having curved, outer rims terminating in peripheral flange portions, an identically-corrugated, rigid supporting element of substantially uniform thickness having a small aperture therein and nesting closely between said elements, a volatile liquid completely filling said aperture in the fully nested position of said diaphragm elements, said flange portions being bonded together throughout their peripheries to form a continuous, vapor-tight seal.

7. An expansible, fluid pressure assembly comprising a pair of corrugated, thin and flexible diaphragm elements having curved, outer rims terminating in peripheral flange portions, an identically-corrugated, rigid supporting element nesting closely between said elements and hermetically sealed to said flange portions, said supporting element being composed of electrical resistance material and provided with a recess therein, and a volatile liquid in said recess adapted to expand said assembly upon heating of said supporting element by the flow of an excessive electrical current therethrough.

8. An expansible, fluid pressure assembly comprising a pair of corrugated, diaphragm elements having curved, outer rims terminating in peripheral flange portions, an identically-corrugated, rigid, apertured supporting element nesting closely between said elements, a coiled sealed tube adjacent one of said diaphragm elements and connected to a central aperture therein, a thermal expansive fluid filling said apertures and said tube, and the latter being made of an electrical resistance material whereby heating of the same by the passage of an excessive electric current therethrough will cause said fluid to expand said assembly.

9. An expansible assembly comprising a pair of corrugated, precipitation-hardenable diaphragm elements having curved, outer rims terminating in peripheral flanged portions which are angularly disposed with respect to the general planes of said elements, said elements being of such thinness as to be permanently deformed when subjected to hardening temperature, and an identically corrugated rigid supporting element of uniform thickness closely nesting between said elements and providing interior reinforcement for each corrugation thereof during said hardening process and thereafter and sealed hermetically thereto only at said flanged portions, at least one of said elements being provided with an opening for a pressure-transmitting fluid.

JURG A. SENN.

REFERENCES CITED

The following references are of record in the file of this patent:

UNITED STATES PATENTS

| Number | Name | Date |
| --- | --- | --- |
| 986,967 | Dunham | Mar. 14, 1911 |
| 1,073,899 | Halsey | Sept. 23, 1913 |
| 1,439,750 | Nelson | Dec. 26, 1922 |
| 1,527,102 | Wingfield | Feb. 17, 1925 |
| 1,547,632 | Wensley | July 28, 1925 |
| 1,612,246 | Whittingham | Dec. 28, 1926 |
| 1,734,624 | Harrison | Nov. 5, 1929 |
| 1,879,791 | Carson | Sept. 27, 1932 |
| 1,934,741 | Schulein | Nov. 14, 1933 |
| 2,045,289 | Bolin | June 23, 1936 |
| 2,150,771 | Kollsman | Mar. 14, 1939 |
| 2,177,564 | Havill | Oct. 24, 1939 |
| 2,289,020 | Jones | July 7, 1942 |
| 2,296,435 | Girard | Sept. 22, 1942 |
| 2,303,911 | Clark | Dec. 1, 1942 |

FOREIGN PATENTS

| Number | Country | Date |
| --- | --- | --- |
| 101,256 | Great Britain | Aug. 31, 1916 |
| 521,273 | Great Britain | Of 1938 |
| 630,529 | Germany | May 29, 1936 |